(12) United States Patent
Ayrignac et al.

(10) Patent No.: US 7,685,470 B2
(45) Date of Patent: Mar. 23, 2010

(54) METHOD AND DEVICE FOR DEBUGGING A PROGRAM EXECUTED BY A MULTITASK PROCESSOR

(75) Inventors: Renaud Ayrignac, La Riviere (FR); Isabelle Sename, Grenoble (FR); Andrew Cofler, La Murette (FR)

(73) Assignee: STMicroelectronics SA, Montrouge (FR)

( * ) Notice: Subject to any disclaimer, the term of this patent is extended or adjusted under 35 U.S.C. 154(b) by 527 days.

(21) Appl. No.: 11/567,990

(22) Filed: Dec. 7, 2006

(65) Prior Publication Data

US 2007/0174714 A1    Jul. 26, 2007

(30) Foreign Application Priority Data

Dec. 9, 2005   (FR)   .................................. 05 12503

(51) Int. Cl.
*G06F 11/00*   (2006.01)
(52) U.S. Cl. .............................. 714/38; 714/25; 714/34; 714/35
(58) Field of Classification Search .................. 714/25, 714/27, 28, 34, 35, 38
See application file for complete search history.

(56) References Cited

U.S. PATENT DOCUMENTS

| | | | | |
|---|---|---|---|---|
| 5,799,142 A * | 8/1998 | Toyoda | .......................... | 714/38 |
| 6,026,501 A * | 2/2000 | Hohl et al. | .................... | 714/38 |
| 6,175,913 B1 * | 1/2001 | Chesters et al. | ....... | 714/E11.214 |
| 6,314,530 B1 * | 11/2001 | Mann | ........................... | 714/38 |
| 6,718,484 B1 * | 4/2004 | Kodera | ........................... | 714/35 |
| 7,409,330 B2 * | 8/2008 | Kumamoto | ................... | 714/38 |
| 2006/0161419 A1 * | 7/2006 | Herrell et al. | ................. | 703/26 |

* cited by examiner

*Primary Examiner*—Robert Beausoliel
*Assistant Examiner*—Joseph D Manoskey
(74) *Attorney, Agent, or Firm*—Lisa K. Jorgenson; Robert Iannucci; Seed IP Law Group

(57) ABSTRACT

A method for debugging a multitask program executed by a processor includes interrupting the processor during the execution of a task of the program, and activating a debugging mode of the processor, wherein the instructions executed by the processor are supplied by an external emulator. The method comprises steps during which: the processor sends an activation message to the external emulator every time the debugging mode is activated, and upon receiving the activation message, the external emulator sends an acknowledgement message to the processor containing at least one portion of the activation message received.

28 Claims, 2 Drawing Sheets

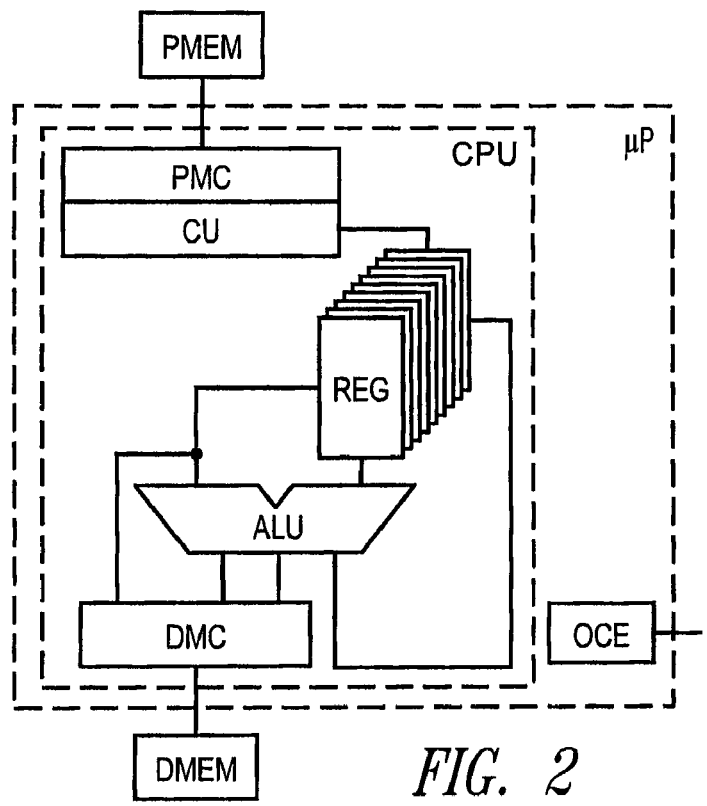
FIG. 1
FIG. 2
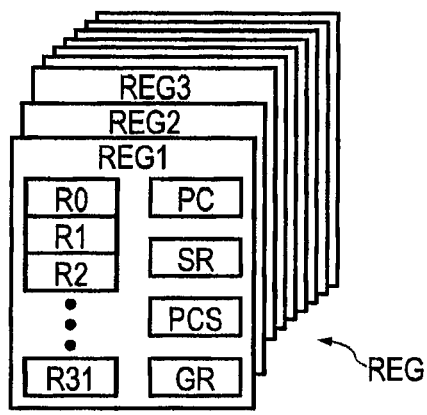
FIG. 3

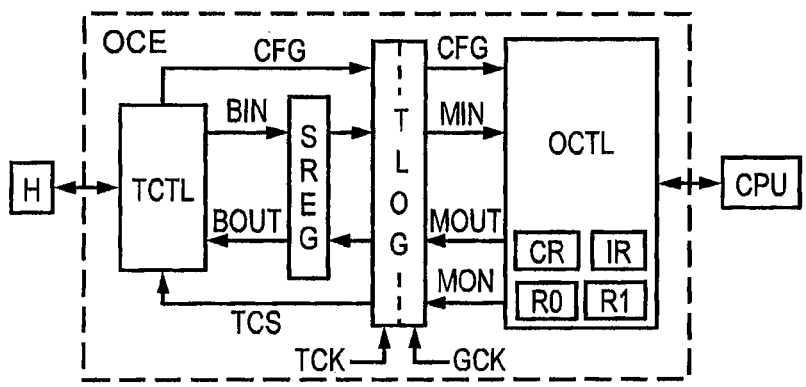
FIG. 4
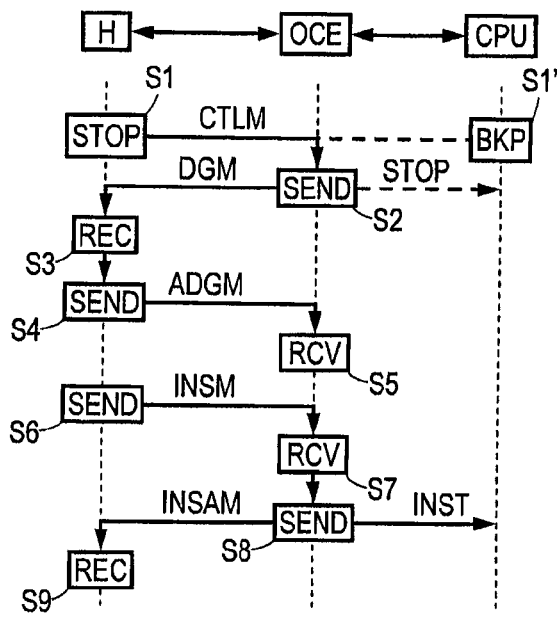
FIG. 5
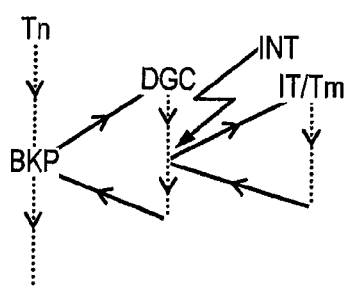  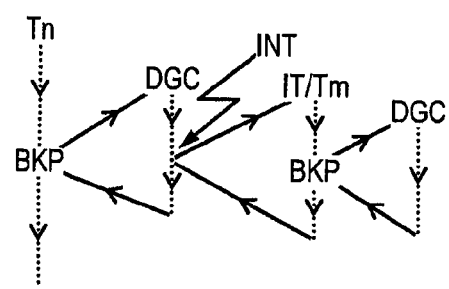
FIG. 6A        FIG. 6B

METHOD AND DEVICE FOR DEBUGGING A PROGRAM EXECUTED BY A MULTITASK PROCESSOR

BACKGROUND OF THE INVENTION

1. Field of the Invention

The methods, systems, and devices described generally relate to a multitask processor and in particular a method for debugging a multitask program executed by a microprocessor- or microcontroller-type processor.

2. Description of the Related Art

Certain processors comprise a test interface enabling an external emulator to be connected to the processing unit of the processor and to send it instructions to be executed. The processor comprises a debugging mode in which the test interface is active and supplies the processing unit with instructions received from the external emulator. The instructions supplied to the processor by the test interface then replace the instructions coming from the program memory.

There are several types of architectures of multitask processor. In architectures of a first type, the processor comprises several processing units (CPU) that share common resources, such as the memory, to each execute one task. In architectures of a second type, the processor comprises a single processing unit which executes several tasks by switching from one task to another. The switch from a first task to a second task is done by interrupting the first task, by saving the registers of the processor used by the first task, then by possibly restoring the registers used by the second task, and finally, by activating the execution of the second task. The switch from one task to another can occur at any time during the execution of the current task, particularly further to an internal or external event. In particular, an internal or external event may trigger the execution of a higher-priority task while another task is in debugging mode. The higher-priority task may access the same resources as the task in debugging mode.

The execution of a multitask program by a processor of the first or of the second type can therefore be very complex. This is why, in principle, classic debugging methods do not authorize the interruption of a debugging task in progress by a higher-priority task, and the higher-priority task to be itself put into debugging mode. A multitask program is therefore generally debugged task by task, starting with the highest-priority tasks. Therefore, the debugging of a multitask program particularly does not enable conflicts between tasks to be detected, such as conflicts of access to resources shared by the tasks.

BRIEF SUMMARY OF THE INVENTION

One embodiment enables a task in debugging mode, executed by a processor with one or more processing units, to be interrupted by a priority task and the priority task to be itself put into debugging mode.

One embodiment is a simple method enabling a multitask program to be debugged.

One embodiment is a simplified test interface linking a processing unit of a processor to an external emulator and enabling a multitask program to be debugged.

One embodiment is a method for debugging a multitask program executed by a processor. The method comprises interrupting the processor during the execution of a task of the program, and activating a debugging mode of the processor, wherein the instructions executed by the processor are supplied by an external emulator. In the method, the processor sends an activation message to the external emulator every time the debugging mode is activated, and upon receiving the activation message, the external emulator sending back an acknowledgement message to the processor containing at least one portion of the activation message received.

According to one embodiment of the present invention, the activation message comprises the current value of a program pointer register.

According to one embodiment of the present invention, the activation message comprises an identifier of the task execution context in debugging mode.

According to one embodiment of the present invention, the debugging mode is interruptible by a priority task of the multitask program.

According to one embodiment of the present invention, every time the processor executes an instruction in debugging mode, it sends an execution reporting message to the external emulator.

According to one embodiment of the present invention, all the instructions received by the processor in debugging mode between the sending of the debugging mode activation message and the receipt of the corresponding acknowledgement message are rejected.

According to one embodiment of the present invention, every time the processor rejects an instruction in debugging mode, it sends a non-execution reporting message to the external emulator.

According to one embodiment of the present invention, the interruption of the execution of a task by the processor to activate the debugging mode is triggered by a break point provided in the instruction sequence of the task.

According to one embodiment of the present invention, the interruption of the execution of a task by the processor to activate the debugging mode is triggered by a command sent by the external emulator.

According to one embodiment of the present invention, the processor receives instructions to be executed from the external emulator, at a rate equal at the most to the one at which it executes the instructions received.

One embodiment is a device for debugging a multitask program executed by a processor, the device comprising: means for interrupting the processor during the execution of a task of the program and activating a debugging mode of the processor, means for receiving instructions from an external emulator, means for sending the instructions received to a processing unit of the processor in debugging mode, means for sending an activation message to the external emulator every time the debugging mode is activated, and means for receiving an acknowledgement message from the external emulator containing at least one portion of the activation message previously sent.

According to one embodiment of the present invention, the activation message comprises the current value of a program pointer register.

According to one embodiment of the present invention, the activation message comprises an identifier of the task execution context in debugging mode.

According to one embodiment of the present invention, the debugging mode is interruptible by a priority task.

According to one embodiment of the present invention, the device comprises means for sending an execution reporting message to the external emulator, every time an instruction is transmitted to the processing unit of the processor in debugging mode.

According to one embodiment of the present invention, the device comprises means for rejecting the instructions to be executed by the processor in debugging mode, received from the external emulator between the sending of the debugging mode activation message and the receipt of the corresponding acknowledgement message.

According to one embodiment of the present invention, the device comprises means for sending a non-execution reporting message to the external emulator, every time the execution of an instruction is rejected in debugging mode.

According to one embodiment of the present invention, the interruption of the execution of a task by the processor to activate the debugging mode is triggered by a break point provided in the instruction sequence of the task.

According to one embodiment of the present invention, the interruption of the execution of a task by the processor to activate the debugging mode is triggered by a command sent by the external emulator.

According to one embodiment of the present invention, the means for receiving instructions from the external emulator, receive instructions at a rate equal at the most to the one at which the transmission means send the instructions received to the processing unit of the processor.

One embodiment relates to a processor comprising a processing unit. The processor comprises a device for debugging a multitask program as defined above.

According to one embodiment of the present invention, the processor is of a microprocessor or microcontroller type.

According to one embodiment of the present invention, the processor comprises several sets of registers each constituting a context for executing a task.

BRIEF DESCRIPTION OF THE SEVERAL VIEWS OF THE DRAWINGS

These and other features and advantages shall be presented in greater detail in the following description of an embodiment, given in relation with, but not limited to the following figures, in which:

FIG. 1 represents in block form a microprocessor connected to an external emulator, FIG. 2 represents in block form the architecture of the microprocessor, FIG. 3 represents registers of the microprocessor, FIG. 4 represents in block form a test interface of the microprocessor, FIG. 5 shows data exchanged between a processing unit of the microprocessor, the test interface and the external emulator.

FIGS. 6A and 6B schematically represent tasks in test mode interrupted by priority tasks.

DETAILED DESCRIPTION OF THE INVENTION

FIG. 1 represents a microprocessor µP connected to an external emulator H through an interface circuit EINT. The external emulator comprises for example a PC-type computer.

FIG. 2 represents the microprocessor µP comprising a processing unit CPU connected to a program memory PMEM and to a data memory DMEM, and a test interface OCE. The processing unit CPU comprises a management unit for managing the program memory PMC, a control unit CU, a register bank REG, an arithmetic and logic unit ALU, and a management unit DMC for managing the data memory DMEM.

The control unit CU is connected to the register bank REG. The arithmetic and logic unit ALU comprises two inputs each linked to an output port of the register bank, and data and address outputs linked to the management unit for managing the data memory DMC, as well as an output linked to an input of the register bank REG. The management unit PMC for managing the program memory is connected to the program memory PMEM, and to the register bank REG. The management unit for managing the data memory DMC is connected to the data memory DMEM.

FIG. 3 represents the register bank REG. In this figure, the register bank REG advantageously comprises several sets of registers REG1, REG2, REG3, etc. Each set of registers is associated with an execution context enabling the microprocessor to execute in parallel several tasks having their own set of registers REGi. Thus, it is not necessary to save and restore the content of the registers in a memory stack upon a switch from one task to a higher-priority task, if these two tasks are associated with different contexts, i.e., use different sets of registers REGi.

Each set of registers REGi comprises general registers R0-R31 used to process the addresses and data, and status and control registers of the microprocessor. The general registers particularly comprise a stack pointer register. The status and control registers comprise a program pointer register PC, a status register SR, an operating mode register PCS and an instruction saving register GR enabling jump instructions and conditional instructions to be executed more efficiently.

FIG. 4 represents the architecture of the test interface OCE which puts an external emulator H in communication with the processing unit CPU of the microprocessor µP. The interface OCE comprises an access port control unit TCTL, a register SREG, a synchronization circuit TLOG between clocks of the microprocessor µP and of the control unit TCNT, and a control unit OCTL of the test interface OCE, connected to the processing unit CPU of the processor.

The link between the external emulator H and the unit TCTL is a bi-directional serial link. The unit TCTL is in charge of inserting into the register SREG the bits BIN received successively from the external emulator H, and conversely, of successively transmitting to the external emulator the bits BOUT inserted into the register by the unit OCTL. The register SREG is designed to save a message to be transmitted to the external emulator or to the control circuit OCTL. The unit TCTL is connected to the unit OCTL through a link CFG and the synchronization circuit TLOG supplying the control circuit OCTL with configuration information. The unit TCTL is connected to the circuit TLOG by a link TCS by which it receives status signals. The register SREG stores a message MIN, MOUT to be transmitted or received from the unit OCTL, through the circuit TLOG. The circuit TLOG receives the clock signals TCK, GCK from the unit TCTL and from the microprocessor µP. The clock signal TCK can have a lower frequency than the clock signal GCK of the microprocessor, as these two signals can be totally asynchronous.

The unit OCTL is in charge of processing the messages received MIN from the external emulator H and successively stored in the register SREG, and of sending to the processing unit CPU instructions to be executed or data being in the messages received. The unit OCTL is also in charge of constituting messages MOUT to be sent to the emulator H, using the content of data exchange registers R0, R1 exchanging data with the processing unit, and of inserting the messages to be sent into the register SREG.

More precisely, the unit OCTL controls the status of the microprocessor through a control register CR. The unit OCTL supplies the processing unit CPU with an instruction to be executed through an instruction register IR, and/or data through registers R0, R1.

The unit TCTL is for example compliant with the standard IEEE 1149.1 (JTAG: Joint Test Access Group). This standard is hereby incorporated by reference in its entirety. The messages exchanged between the interface OCE and the external emulator have for example 40 bits. The register SREG which determines the size of the messages exchanged, is designed so as to save for example 40 bits.

FIG. 5 represents the data exchanged between the external emulator H and the test interface OCE, firstly, and secondly, between the interface and the processing unit CPU of the microprocessor.

When the microprocessor is in normal operating mode, the test interface unit OCE is inactive. The test unit OCE can be activated by applying a determined signal to an input of the processor either at the time of initializing the processor, or when the processor is executing a program.

Once active, the test interface monitors the status of the status registers of the processing unit and in particular the status of a bit of the status register SR indicating that the microprocessor is in debugging mode or not, and exchanges messages with the external emulator H.

The debugging mode is activated when the test interface receives from the external emulator H a control message CTLM comprising a stop command (step S1), or when the instruction executed by the processing unit CPU is a break point BKP (step S1'). When the processing unit encounters a break point, it updates the bit of the status register SR to indicate that the microprocessor is in debugging mode.

A stop command is saved in the control register CR of the unit OCTL and is taken into account by the microprocessor if the debugging mode is not yet activated for the context of the task being executed, and if the activation of the debugging mode of the current context is authorized in accordance with a configuration register of the microprocessor.

When the debugging mode is activated, the unit OCTL generates and sends in the register SREG a debugging mode DGM activation message containing a context number of the task interrupted and the value of the program pointer register PC. The message DGM is transmitted by the unit TCTL to the external emulator H (step S2). Upon receiving the message DGM (step S3), the external emulator H sends an acknowledgement message ADGM containing the value of the context and of the register PC contained in the message DGM received (step S4). The message ADGM is received by the test interface OCE in step S5.

Once the microprocessor is in debugging mode, the external emulator can send instructions to be executed contained in messages INSM (step S6). Each message INSM contains an instruction which can be a read or write command for reading or writing the registers R0, R1, CR of the unit OCTL or an instruction to be executed by the processing unit CPU. Each message INSM is received by the test interface OCE (step S7). If the message contains an instruction INST to be executed by the unit CPU, the control unit OCTL sends the instruction INST to the processing unit CPU. Upon receiving each message INSM, the interface OCE sends a message for executing the instruction INSAM to the external emulator H (step S8). The message INSAM is received by the external emulator in step S9.

The exit from the debugging mode can be triggered from the external emulator by sending an update message for updating the register CR to set a debugging mode activation indicator to 0. It can also be triggered by the microprocessor activating a higher-priority task that is not in debugging mode.

FIG. 6A represents a task Tn executed by the microprocessor µP. The program of the task comprises a break point instruction BKP. When the program pointer PC reaches the instruction BKP, the debugging mode of the microprocessor is activated. In this mode, the microprocessor does not execute the instructions of the program of the task being executed, but instructions DGC supplied by the external emulator H. As described above, the debugging mode can also be activated from the external emulator H which sends a stop command. In debugging mode, the program pointer register PC remains the same while the execution of a priority task is not activated. The test interface has stored the value of the program pointer and the context of the task Tn which has been interrupted. If an external or internal signal INT for triggering an interrupt routine IT or a priority task Tm occurs, the microprocessor exits the debugging mode, executes the interrupt routine or the priority task. At the end of the execution of the interrupt routine IT or of the task Tm, the microprocessor returns to test mode due to the restoration of the registers including the status register SR saving a debugging mode activation status, and the register PC which takes the value corresponding to the break point BKP again.

As the link between the external emulator H and the microprocessor has a low rate, certain messages INSM containing instructions intended for the interface OCE or for the processing unit CPU may not have been executed before the triggering of the interruption. The instructions not executed before the interruption are executed further to the return of the microprocessor to debugging mode.

As shown in FIG. 6B, the interrupt routine IT or the task Tm can themselves comprise a break instruction BKP activating the debugging mode of the microprocessor. The test interface OCE is then informed of a change of task (change in the value of the program pointer PC and possibly change in the context). In turn, the test interface informs the external emulator H that a change in context occurred by sending the message DGM, and waits for the corresponding acknowledgement message ADGM. The test interface rejects all the instruction messages INSM received between the change in context and the receipt of the acknowledgement message ADGM and informs the external emulator thereof by sending an instruction non-execution message INSAM for each instruction message rejected. The external emulator H can thus determine which instructions sent have not been executed by the test interface OCE before the interruption of the debugging mode. This arrangement is due to the slowness of the transmissions between the external emulator, the test interface and the microprocessor, compared to the speed of execution of an instruction by the microprocessor.

When the external emulator ends the debugging mode of the interrupt routine IT or of the task Tm by ordering the update of the register CR, the microprocessor exits the debugging mode and resumes the execution of the interrupt routine IT or of the task Tm. At the end of the execution of the routine IT or of the task Tm, the status register SR of the context corresponding to the task Tn that was in debugging mode is restored. The microprocessor therefore returns in debugging mode.

The exchange of the debugging mode activation messages and the acknowledgment messages provides the certainty that all the instructions received from the external emulator by the test interface further to the acknowledgement message do relate to the last task interrupted in debugging mode, and not to a task previously put in debugging mode and the debugging of which was interrupted by a higher-priority task. Thus, it is not necessary for each instruction to be executed by the processor, sent by the external emulator, to contain a reference to the task in debugging mode. Thus, there is no need to increase the size of the instruction messages INSM transmitted by the external emulator, and the effective rate of the transmission between the external emulator and the test interface is not decreased. The test interface can therefore have a simplified architecture only occupying a limited surface area on the integrated circuit constituting the processor.

It will be understood by those skilled in the art that various alternative embodiments of the present invention are possible. In particular, it is not necessary for the debugging mode activation message sent by the test interface to contain the value of the program pointer register and the context number of the task interrupted. On the other hand, the test interface is capable of establishing the connection between the acknowledgement message received from the external emulator and the debugging mode activation message previously sent.

It is not necessary for the processor to have several sets of registers, i.e., supporting several task execution contexts. The present invention can also be applied to a processor having only one set of registers. In this case, the debugging mode activation message and the corresponding acknowledgement message can contain only the value of the program pointer register which enables the connection between these two messages to be established.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for debugging a multitask program executed by a processor, comprising:
    interrupting the processor during execution of a task of the program;
    activating a debugging mode of the processor, wherein instructions executed by the processor are supplied by an external emulator;
    the processor sending an activation message to the external emulator when the debugging mode is activated; and
    upon receiving the activation message, the external emulator sending back an acknowledgement message to the processor containing at least one portion of the activation message received.

2. The method according to claim 1, wherein the activation message comprises a current value of a program pointer register.

3. The method according to claim 1, wherein the activation message comprises an identifier of the task execution context in debugging mode.

4. The method according to claim 1, wherein interrupting the processor comprises interrupting the processor during execution of the debugging mode in order to execute a priority task of the multitask program.

5. The method according to claim 1, wherein, every time the processor executes an instruction in debugging mode the processor sends an execution reporting message to the external emulator.

6. The method according to claim 1, wherein all instructions received by the processor in debugging mode between the sending of the debugging mode activation message and the receipt of the corresponding acknowledgement message are rejected.

7. The method according to claim 6, further comprising:
    sending a non-execution reporting message to the external emulator when the processor rejects an instruction in debugging mode.

8. The method according to claim 1, wherein the interrupting the processor during the execution of the task is triggered by a break point provided in the instruction sequence of the task.

9. The method according to claim 1, wherein the interrupting the processor during the execution of the task is triggered by a command sent by the external emulator.

10. The method according to claim 1, wherein during the debugging mode, the processor receives instructions to be executed from the external emulator at a rate equal at the most to the one at which it executes the instructions received.

11. A device for debugging a multitask program executed by a processor, comprising:
    means for interrupting the processor during execution of a task of the program;
    means for activating a debugging mode of the processor;
    means for receiving instructions from an external emulator;
    means for sending the instructions received to a processing unit of the processor in debugging mode;
    means for sending an activation message to the external emulator when the debugging mode is activated; and
    means for receiving an acknowledgement message from the external emulator containing at least one portion of the activation message previously sent.

12. The device according to claim 11, wherein the activation message comprises the current value of a program pointer register.

13. The device according to claim 11, wherein the activation message comprises an identifier of the task execution context in debugging mode.

14. The device according to claim 11, wherein the debugging mode is interruptible by a priority task.

15. The device according to claim 11, further comprising:
    means for sending an execution reporting message to the external emulator when an instruction is transmitted to the processing unit of the processor in debugging mode.

16. The device according to claim 11, further comprising:
    means for rejecting the instructions to be executed by the processor in debugging mode when the instructions received from the external emulator are received between the sending of the debugging mode activation message and the receipt of the corresponding acknowledgement message.

17. The device according to claim 16, further comprising:
    means for sending a non-execution reporting message to the external emulator when the execution of an instruction is rejected in debugging mode.

18. The device according to claim 11, wherein the interruption of the processor to activate the debugging mode is triggered by a break point provided in the instruction sequence of the task.

19. The device according to claim 11, wherein the interruption of the processor to activate the debugging mode is triggered by a command sent by the external emulator.

20. The device according to claim 11, wherein the means for receiving instructions from the external emulator comprises receiving instructions at a rate equal at the most to the one at which the transmission means send the instructions received to the processing unit of the processor.

21. A processor comprising:
    a processing unit, having a device that includes:
        means for interrupting the processor during execution of a task of the program;
        means for activating a debugging mode of the processor;
        means for receiving instructions from an external emulator;

means for sending the instructions received to a processing unit of the processor in debugging mode;

means for sending an activation message to the external emulator when the debugging mode is activated; and means for receiving an acknowledgement message from the external emulator containing at least one portion of the activation message previously sent.

22. The processor according to claim 21, wherein the processor is a microprocessor or microcontroller.

23. The processor according to claim 21, further comprising:

several sets of registers each constituting a context for executing a task.

24. A computing system for debugging a multi-task program, comprising:

an external emulator; and a microprocessor configured to be interrupted during execution of a task in order for the program to enter a debugging mode, the microprocessor including:

a memory;

a processing unit communicatively coupled to the memory; and a test interface communicatively coupling the processing unit and the external emulator, wherein the test interface is configured to facilitate debugging of the program by providing means for:

transmitting an activation message to the external emulator once the microprocessor enters the debugging mode, wherein the debugging mode is interruptible by a priority task;

receiving an acknowledgement message corresponding to the activation message from the external emulator after sending the activation message, the acknowledgement message containing at least one portion of the activation message transmitted to the external emulator; and providing instructions to the processing unit, the instructions received from the external emulator.

25. The computing system of claim 24, wherein the test interface further provides means for transmitting an execution reporting message to the external emulator when the microprocessor executes an instruction in the debugging mode.

26. The computing system of claim 24, wherein the test interface further provides means for transmitting a non-execution reporting message to the external emulator when the microprocessor receives premature instructions in debugging mode between the times of transmitting the activation message and receipt of the acknowledgement message, the premature instructions being rejected by the microprocessor.

27. The computing system of claim 24, wherein the microprocessor receives instructions from the external emulator at a rate equal at most to the rate at which the microprocessor executes the instructions received.

28. The computing system of claim 24, wherein the priority task enters the debugging mode.

* * * * *